J. RIVERS.
ADJUSTABLE CLAMP.
APPLICATION FILED DEC. 16, 1907.
898,604.
Patented Sept. 15, 1908.
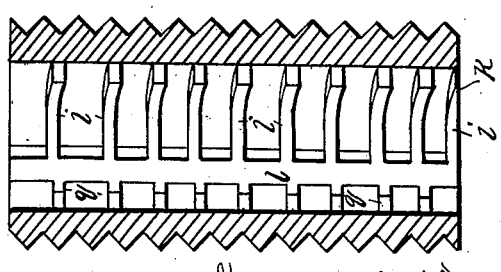
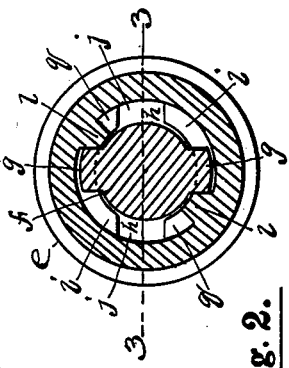
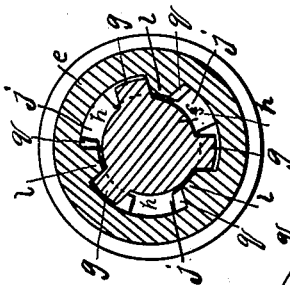
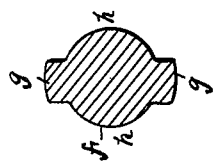
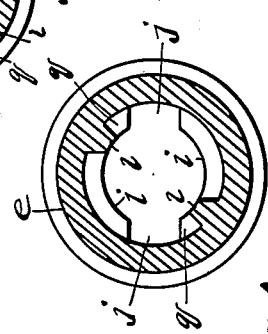
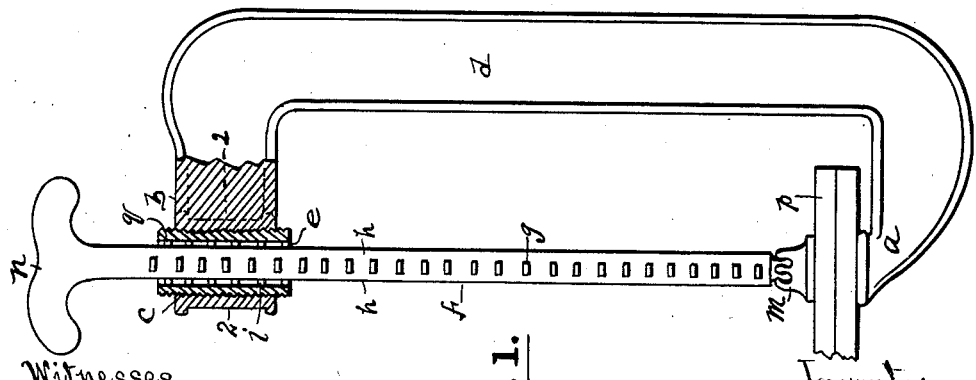
Witnesses.
O. B. Baenziger
G. E. McGraun
Inventor.
John Rivers
By Newell S. Wright
his Attorney.

UNITED STATES PATENT OFFICE.

JOHN RIVERS, OF DETROIT, MICHIGAN.

ADJUSTABLE CLAMP.

No. 898,604.  Specification of Letters Patent.  Patented Sept. 15, 1908.

Application filed December 16, 1907. Serial No. 406,685.

*To all whom it may concern:*

Be it known that I, JOHN RIVERS, a subject of the Czar of Russia, having declared my intention to become a citizen of the United States, residing at Detroit, in the county of Wayne and State of Michigan, have invented certain new and useful Improvements in Adjustable Clamps, of which the following is a specification.

My invention has for its object certain new and useful improvements in an adjustable clamp of superior construction, efficiency, and utility; and it consists of the construction, combination and arrangement of devices and appliances hereinafter described and claimed; and illustrated in the accompanying drawings, in which Figure 1. is a view in elevation, showing parts in section. Fig. 2. is a view in section on the line 2—2 Fig. 1. Fig. 3. is a view in longitudinal section on the line 3—3 Fig. 2. Fig. 4. is a view in transverse section of the bushing. Fig. 5. is a view in transverse section of the toothed rod. Fig. 6. is a view similar to Fig. 2, but showing a modification.

My invention is adapted for a variety of uses wherever an adjustable clamp and a quick adjustment thereof is required. The provision for quick adjustment of the device is a principal feature of my invention.

I carry out my invention as follows: In the drawings my improved adjustable clamp is shown having any suitable frame provided with a fixed arm $a$, and a fixed head $b$ provided with a threaded orifice $c$, a web $d$ connecting said arm and head. The arm and head project laterally from the web. Within the threaded orifice $c$, is an exteriorly threaded bushing $e$, through which is passed a rod $f$ provided with transversely elongated teeth $g$, arranged in longitudinal rows as upon opposite sides thereof. The teeth $g$ are not continuous but are arranged with elongated grooves or spaces $h$, therebetween. I prefer that the teeth $g$, should extend in a straight line transversely of the rod, as shown, and of a sufficient length to make them strong and durable and to afford firm engagement with the bushing. The bushing has interior flanges shown at $i$, arranged in corresponding longitudinal rows. The interior flanges of the bushing are not made continuous thereabout, but are spaced to form grooves $j$, on the opposite sides of the bushing, so arranged that the teeth of the rod may pass longitudinally through the grooves of the bushing without engaging the flanges of the bushing, when it is desired to move the rod freely through the bushing, in securing its proper adjustment upon the work. The interior flanges of the bushing are elongated transversely of the bushing to afford a strong engagement of the teeth of the rod therewith, the flanges of the bushing constituting ledges upon which the teeth of the rod engage, the length of the flanges being such as to prevent any accidental disengagement of the lugs of the rod therewith when the device has tightened upon the work. If the flanges of the bushing were made short, in tightening the rod upon the work, the teeth of the rod would be liable to slip or kick off from the flanges of the bushing, but my invention contemplates so elongating the flanges of the bushing as to prevent any such liability.

It has been found that in tightening the rod in place upon the work, in analogous constructions, the liability of the accidental disengagement of the teeth of the rod from the flanges of the bushing requires that special provision should be made, other than above described, to prevent any such liability. To this end I prefer to turn or curve downward the extremities of the inner flanges of the bushing adjacent to the corresponding grooves $j$, as shown at $k$. It will be understood that the strain is upward and consequently that by turning down the extremities of the inner flanges of the bushing any accidental disengagement of the teeth of the rod from the bushing will be prevented. Each set or row of the interior flanges of the bushing has their inner ends connected by a corresponding elongated rib $l$. When the teeth of the rod are engaged with the flanges of the bushing and abut against the corresponding ribs the bushing will be turned in the head, by the further revolutions of the rod to tighten it freely upon the work. When the teeth of the rod are disengaged from the inner flanges of the bushing, the rod may pass freely through the grooves of the bushing. The teeth of the rod and the grooves of the bushing being in alinement, permit the rod to be adjusted freely as the thickness of the work may require. If this adjustment has been accomplished, by turning the rod in the right direction, its teeth will engage with the flanges of the bushing to tighten the device upon the work. The work, it will be understood, is located between the arm $a$ of the frame and the adjacent end of the rod. I prefer to attach to tne lower end of the rod a foot m, which has a swiveled engagement therewith to rest upon the work. The rod is shown provided with any suitable hand grip n. A piece of work is indicated at p. In Figs. 1–5 the teeth of the rod and the inner flanges of the bushing are arranged in two rows located on opposite sides, but in Fig. 6. I have shown constructions where the bushing and rod are provided with more than two sets of flanges, as I do not limit myself to any specific number of the rows of flanges on the bushing and rod.

It will be apparent that in turning the bushing downward in engaging the device upon the work, it may be desirable to retract the bushing in the head of the frame in order to reëngage the device upon different pieces of work. To enable the operator to accomplish this result in a speedy manner, should it be desired, I provide the interior of the bushing with additional ledges q on the opposite side of the rib from the corresponding inner flanges. This provision enables the operator to simply reverse his rod, thereby engaging the teeth of the rod with the ledges q of the bushing and thereby to turn the bushing back in its threaded engagement in the head, then when the bushing has been sufficiently turned back, by reversing the rotation of the rod, it will be in position to engage the flanges h of the bushing.

It will be understood that the parts of the clamp may be made in any suitable size, thickness, or length, and that the teeth of the rod and the flanges of the bushing may also be made of any desired size, thickness, or length, in accordance with the pressure required. The rod may be made to operate left or right handed, as may be desired. The quickness of adjustment is the strong point of my invention. The ledges q are preferably located on a line parallel with the surface of the downwardly turned extremities of the flanges i to facilitate the engagement of the teeth of the rod with the flanges i when the rod is reversed to engage the work.

What I claim as my invention is:

1. An adjustable clamp comprising a frame having a fixed arm and a head, a bushing having a threaded engagement in the head provided with rows of interior flanges and separated longitudinal grooves or spaces, a rod provided with rows of teeth and separated longitudinal grooves or spaces engaged within the bushing, whereby the rod may be moved freely through the bushing to adjust the rod in the bushing, the interior flanges of the bushing being extended transversely of the bushing to constitute firm supports for the teeth of the rod, the interior flanges of the bushing being curved or turned downward at one extremity thereof, for the purpose described.

2. An adjustable clamp comprising a frame having a fixed arm and head, a bushing having a threaded engagement in the head provided with rows of interior flanges and separated longitudinal grooves or spaces, a rod provided with rows of teeth and separated longitudinal grooves or spaces engaged within the bushing, whereby the rod may be moved freely through the bushing to adjust the rod in the bushing, the interior flanges of the bushing being extended transversely of the bushing to constitute firm supports for the teeth of the rod, and a longitudinal rib connecting the inner extremities of each row of said interior flanges within the bushing, the interior flanges of the bushing being curved or turned downward at their extremities opposite the corresponding ribs, for the purpose described.

3. An adjustable clamp comprising a frame having a fixed arm and head, a bushing having a threaded engagement in the head provided with rows of interior flanges and separated longitudinal grooves or spaces, a rod provided with rows of teeth and separated longitudinal grooves or spaces engaged within the bushing, whereby the rod may be moved freely through the bushing to adjust the rod in the bushing, the interior flanges of the bushing being extended transversely of the bushing to constitute firm supports for the teeth of the rod, a longitudinal rib connecting the inner extremities of each row of said interior flanges within the bushing, and ledges projecting from the corresponding ribs on the opposite side thereof from said flanges for the purpose described.

In testimony whereof I have signed this specification in presence of two witnesses.

JOHN RIVERS.

Witnesses:
N. S. WRIGHT,
FRANK A. NOAH.